US00RE35536E

United States Patent [19]

Irissou et al.

[11] E Patent Number: Re. 35,536

[45] Reissued Date of Patent: Jun. 17, 1997

[54] TELEPHONE HEADSET AMPLIFIER WITH BATTERY SAVER, RECEIVE LINE NOISE REDUCTION, AND CLICK-FREE MUTE SWITCHING

[75] Inventors: Pierre R. Irissou, Sunnyvale; Shu-Ren Chen, Santa Cruz; Dwight D. Lynn, Santa Cruz; Kirk A. Reid, Santa Cruz, all of Calif.

[73] Assignee: ACS Wireless, Inc., Scotts Valley, Calif.

[21] Appl. No.: 503,811

[22] Filed: Jul. 18, 1995

Related U.S. Patent Documents

Reissue of:

[64] Patent No.: 5,353,347
Issued: Oct. 4, 1994
Appl. No.: 830,712
Filed: Feb. 4, 1992

[51] Int. Cl.[6] ..... H04M 1/00

[52] U.S. Cl. ..... 379/395; 379/390; 379/413; 330/254

[58] Field of Search ..... 379/390, 395, 379/387, 388, 413, 421, 430, 441, 442; 330/254; 381/110, 106, 187, 4, 5, 6

[56] References Cited

U.S. PATENT DOCUMENTS

| | | | |
|---|---|---|---|
| 3,691,311 | 9/1972 | Wilson | 379/395 |
| 3,706,852 | 12/1972 | Angus | 379/395 |
| 4,081,620 | 3/1978 | Goodman et al. | 379/395 |
| 4,453,264 | 6/1984 | Hochstein | 381/110 |
| 4,464,632 | 8/1984 | Yoshihisa et al. | 330/254 |
| 4,536,888 | 8/1985 | Wilson | 381/106 |
| 4,542,263 | 9/1985 | Mitani | 379/395 |
| 4,879,746 | 11/1989 | Young et al. | 379/399 |
| 4,917,504 | 4/1990 | Scott et al. | 381/187 |
| 4,918,726 | 4/1990 | Snyder | 379/395 |
| 4,928,306 | 5/1990 | Biswas et al. | 379/201 |
| 4,928,307 | 5/1990 | Lynn | 379/395 |
| 4,930,156 | 5/1990 | Norris | 379/388 |
| 4,951,002 | 8/1990 | Hanon | 330/151 |
| 4,975,949 | 12/1990 | Wimsatt et al. | 379/387 |
| 4,984,265 | 1/1991 | Connan et al. | 379/390 |
| 5,014,017 | 5/1991 | Ishiguro et al. | 379/395 |
| 5,036,536 | 7/1991 | Hanon et al. | 379/387 |
| 5,057,787 | 10/1991 | Arai et al. | 330/254 |
| 5,058,155 | 10/1991 | Larsen | 379/442 |
| 5,070,527 | 12/1991 | Lynn | 379/390 |
| 5,099,514 | 3/1992 | Acree | 379/441 |
| 5,185,789 | 2/1993 | Hanon et al. | 379/395 |
| 5,396,551 | 3/1995 | Lucey | 379/395 |

*Primary Examiner*—Krista M. Zele
*Assistant Examiner*—Scott Wolinsky
*Attorney, Agent, or Firm*—Limbach & Limbach L.L.P.

[57] ABSTRACT

An amplifier for amplifying a signal received on a telephone line and for providing the amplified signal to a telephone headset. The amplifier draws current from a battery. The current drawn is reduced in the absence of activity on the line. The amplifier includes a timer that generates a first control signal after a time-out time. The timer is reset by a second control signal. A threshold circuit generates the second control signal when the signal on the telephone line is above a threshold level. [Finally, a] *A* circuit, responsive to the first control signal, reduces the current drawn from the power supply. The amplifier may additionally or alternatively include receive line muting. The amplifier includes an automatic level control circuit that receives the signal received on the telephone line and controls the level of the amplified signal provided to the headset to a set level in response to a second control signal. [Finally, a] *A* control circuit generates the second control signal in response to the amplified signal provided to the headset and in response to the inverse of the first control signal. The inverse of the first control signal substantially reduces the set level. Finally, the amplifier includes a microphone amplifier with click-free muting.

31 Claims, 4 Drawing Sheets

TELEPHONE HEADSET AMPLIFIER WITH BATTERY SAVER, RECEIVE LINE NOISE REDUCTION, AND CLICK-FREE MUTE SWITCHING

Matter enclosed in heavy brackets [ ] appears in the original patent but forms no part of this reissue specification; matter printed in italics indicates the additions made by reissue.

BACKGROUND OF THE INVENTION

Telephone headset amplifiers provide an interface between the telephone and the headset worn by the telephone operator. The headset amplifier receives the audio signal from the telephone, limits the maximum amplitude of the audio signal to improve operator safety, and provides a power output to drive the earphone part of the telephone headset. The headset provides power for the headset microphone, and takes the audio signal from the microphone, switches the gain of the audio signal from the microphone, and drives the gain-switched signal from the microphone into the telephone line through a 4 to 2 wire convertor in the telephone. Sidetone is generated in the 4 to 2 wire convertor enabling the operator to hear through the earphone what he/she is saying into the microphone.

Headset amplifiers can be powered from the a.c. line by an a.c. to D.C. power supply, or they can draw power from the telephone line. Modern headset amplifiers are battery powered, usually by two "AA"-size alkaline cells. Batteries provide a convenient power source for a telephone headset amplifier, but, since they have finite life, powering a telephone headset from batteries can be relatively expensive, and can also present reliability problems. It has proved difficult to train telephone operators to switch the headset amplifier off when the operator leaves the workstation. Failure to switch the amplifier off increases cost, because the batteries continue to provide current while the amplifier is not being used. Failure to switch the amplifier off also reduces reliability, because the batteries of an amplifier left on overnight or over the weekend are less serviceable, which forces the replacement of batteries often enough to become an annoyance.

Gain switching is applied to the microphone output to reduce pickup of extraneous sounds when the operator is not speaking. Additionally, it is desirable to be able to mute the microphone output briefly at times such as when the operator has to sneeze or cough. Known muting circuits tend to cause an annoying click or pop on the transmit linc when the operator operates the mute switch.

Between calls on many telephone systems on which headsets are used continuously there is idle channel noise. The operator must listen to this noise while nobody is speaking on the line. The operator cannot remove or disconnect his/her headset to avoid listening to this noise, because the operator must be ready at all times to deal with incoming calls. Such noise is undesirable since it causes operator fatigue and reduces operator efficiency.

BRIEF DESCRIPTION OF THE INVENTION

A telephone headset amplifier according to the invention includes a line monitor circuit that monitors the activity on the receive telephone line. If the line monitor circuit indicates that there is no activity on the receive line above its threshold, a timer circuit begins to time a time-out time. If the timer reaches the end of its time-out time without there being activity on the line, a control signal generated by the timer changes state. Immediately there is activity on the receive line above the threshold level of the line monitor circuit, the timer is reset and the control signal reverts to its original state.

The control signal from the timer controls the battery saver circuit. The circuitry of the amplifier is contained in a large-scale integration analog integrated circuit that includes a reference voltage line that drives all the current generators in the amplifier. When the control signal changes state, it pulls this reference voltage to ground level, which significantly reduces the current drawn by the amplifier to a few tens of microamps.

The timer derives its time constant by charging a relatively small capacitor with the base current of a high-gain transistor, which enables a time constant of about 3 minutes to be obtained using a 1 μF capacitor.

The line monitor also controls the output level of automatic level control circuit in the earphone driving circuit. The line monitor gradually reduces the output level of the amplifier, and hence the line noise heard by the operator, when the activity on the receive line falls below the threshold of the line monitor. The gradual reduction in output level enables the receive line noise to be reduced without clicks or pops being heard in the earphone.

The headset microphone is amplified by a switched gain amplifier that provides normal amplification, microphone quieting of about 16 dB and microphone muting. The switched gain amplifier is controlled by a manual mute switch, which selects the amplifier's mute condition, and a microphone monitor circuit and threshold circuit that selects between the amplifier's normal and quieting conditions. The amplifier switches between its three gain conditions without causing clicks and pops on its output The input signal is fed with suitable attenuation into one of three identical differential pairs of transistors feeding a common load. One of the pairs of transistors is selected by feeding the current from a single current generator into a selected one of three identical current mirrors, each feeding one of the differential pairs.

DETAILED DESCRIPTION OF THE INVENTION

Figure 1:
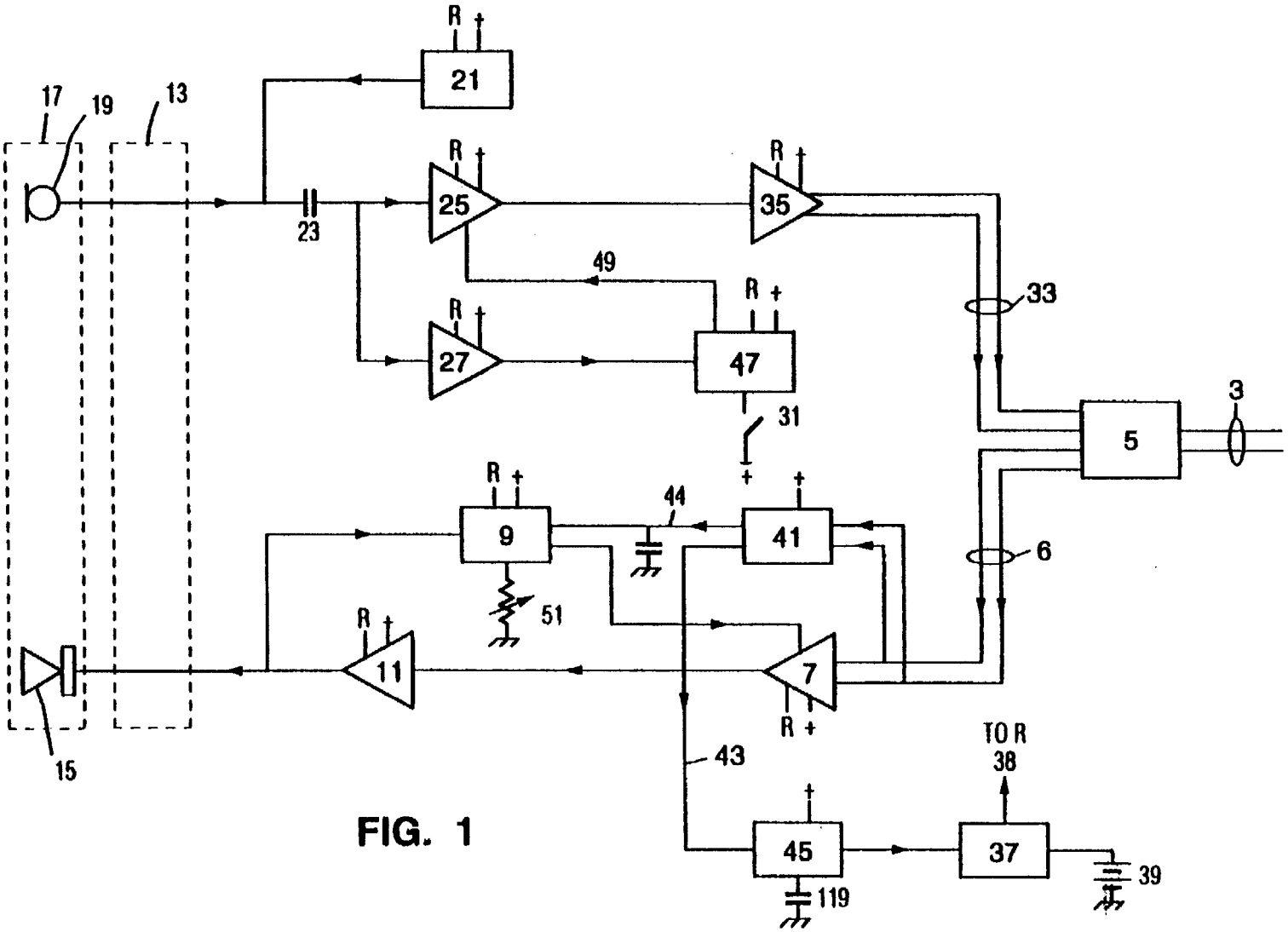
FIG. 1 shows a block diagram of a telephone headset amplifier according to the invention.

A block diagram of the headset amplifier according to the invention is shown in FIG. 1. The telephone line 3 is connected to the 4 to 2 coupler 5 in the telephone (not shown). The amplifier 1 includes the automatic level control (ALC) amplifier 7 to which the telephone receive lines 6 from the 4 to 2 coupler 5 are differentially connected. The ALC amplifier 7 limits the maximum amplitude of the audio signal from the receive lines. An ALC feedback circuit 9 monitors the output of the earphone driver amplifier 11 and provides the control signal for the ALC amplifier 7, which is typically a transconductance amplifier. The output of the ALC amplifier 7 is connected to the input of the earphone driver amplifier 11, the output of which is connected though the cord 13 to the earphone 15 in the headset 17. Suitable frequency response shaping may be applied in either of the amplifiers 7 or 11.

Also included in the headset 17 is the microphone 19, which is normally an electret microphone powered by the microphone power supply 21. The audio output of the microphone 19 is coupled though the capacitor 23 into the microphone switched gain amplifier 25, the gain of which is controlled by the microphone monitoring circuit 27, and by the manual mute switch 31.

The amplified microphone signal is coupled into the transmit driver 35 which differentially drives the transmit lines 33 into the 4 to 2 coupler 5 in the telephone (not shown), and thence into the telephone line 3.

Each of the active blocks shown has a power supply input (marked with the "+" symbol) which is connected to the power supply 37. The power supply may be powered by the batteries 39 which, in the preferred embodiment, are two "AA"-sized alkaline cells, but could be a greater or lesser number of the same or different sized cells, if desired. The power supply 37 also generates a reference signal, which is connected to the reference input terminal (marked "R") on each of the active blocks of the circuit by the reference line 38. Current generator circuits in the active blocks are connected to the reference line 38.

The circuitry just described is found in known telephone headset amplifiers which suffer from the battery life, microphone muting dicks and pops, and line noise problems discussed above. The headset amplifier 1 according to the invention additionally includes the line monitor 41, which is connected differentially to the receive lines 6. The line monitor 41 monitors the signal level on the receive lines 6 and produces two control signals 43 and 44 at its output. When the signal level on the receive lines 6 is above the threshold level of the line monitor 41, the control signals 43 and 44 are each in one of their two possible states. When the signal level on the receive line 6 is below the threshold level of the line monitor 41, the control signals 44 are each in the other of their two possible states.

The control signal 43 controls the timer 45. When the control signal 43 changes to its state that indicates that activity on the receive line is below the threshold of the line monitor 41, the timer begins timing its time-out time. Any change in state of the control signal 43 resets the timer, and timing starts over again. If the control signal stays in its condition indicating that activity on the receive line is below the threshold of the line monitor 41 for more than the time-out time of the timer, the output of the timer changes state. The output of the timer controls the voltage level on the reference line 38. When the output of the timer 45 is in its normal state, the reference line 38 is at its normal voltage. When the output of the timer 45 changes state, it pulls the level of the reference line 38 down to ground level, which reduces the current drawn by the current generators connected to the reference line 38 to a low level, and consequently reduces the current drawn by the amplifier 1 from the batteries 39.

The control signal 44 from the line monitor 41 is connected to the control circuit 9 of the receive ALC amplifier 7. The control signal 44 controls the current output of the ALC feedback circuit 9 and thus changes the output level of the receive ALC amplifier 7 by a fixed amount, irrespective of the actual output level, which depends on the setting of the manual volume control 51. In the preferred embodiment, the control signal 44 changes the output level of the receive ALC amplifier 7 by about 12 dB.

The telephone headset amplifier 1 according to the invention also includes a microphone mute and quieting circuit, in which the switched gain amplifier 25, the microphone monitoring amplifier 27 and the microphone control circuit 47 together provide click-free switching for microphone quieting and microphone muting. The switched microphone amplifier has three gain states that are selected by the microphone control circuit 47. The microphone control circuit selects the normal gain condition and the −16 dB quieting gain condition depending on whether the signal level at the output of the microphone monitoring amplifier 27 is above or below, respectively, the threshold level set by the microphone control circuit 47. The microphone control circuit 47 also selects a mute condition in the switched gain amplifier 25, in which the output level is reduced by about 60 dB. The mute condition is selected in response to the manual mute switch 31, which overrides the selection of the normal or quieting conditions. The gain of the switched gain amplifier 25 is selected in a way that avoids clicks and pops.

The Battery Saver

The Line Monitor

Figure 2:
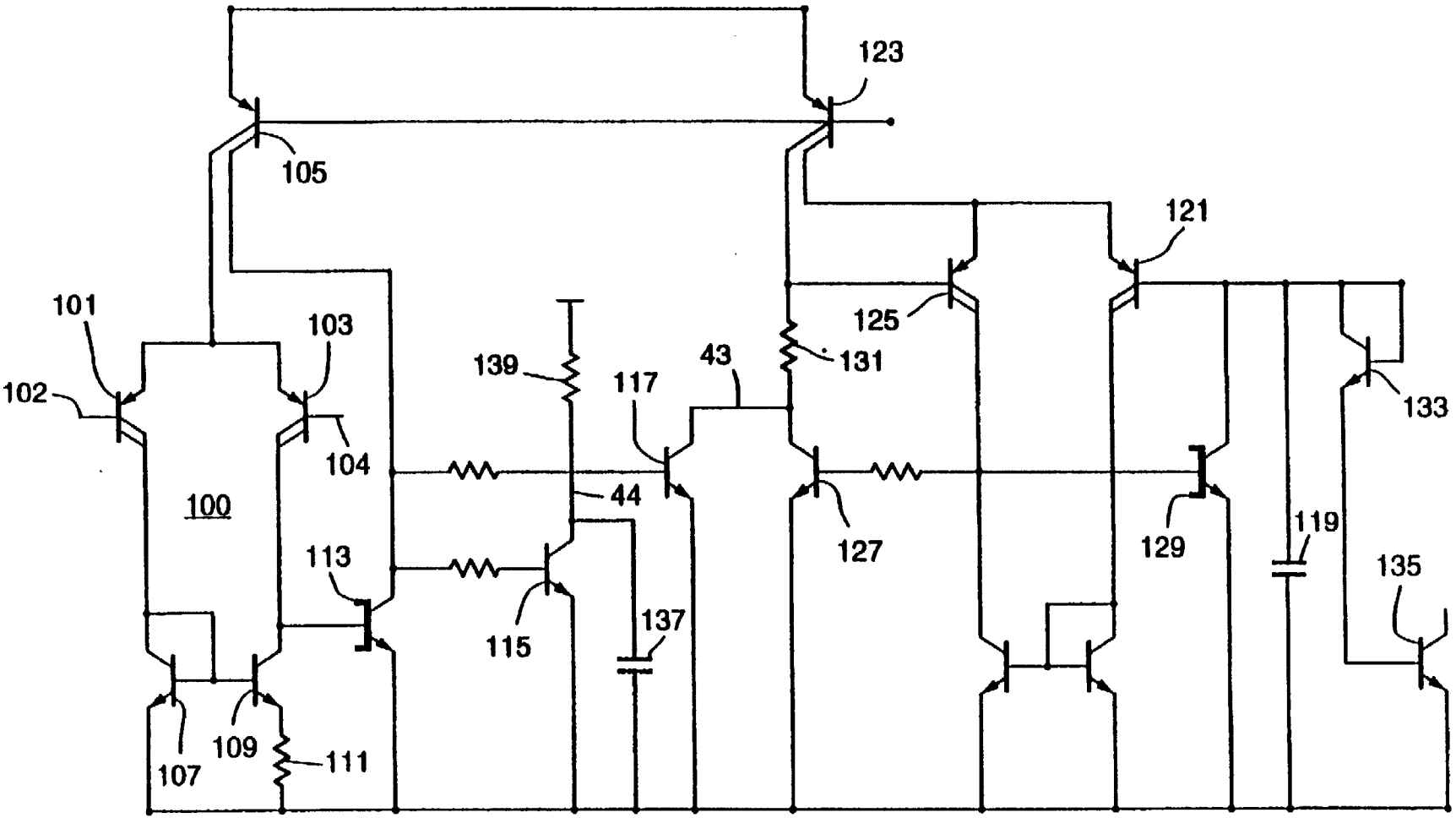
FIG. 2 shows a schematic diagram of the receive line monitor and the timer circuit according to the invention.

FIG. 2 shows a detailed schematic of the receive line monitor 41. The figure also shows the timer 45. In the line monitor 41, the receive signal from the receive line 6 (FIG. 1) is applied differenially to the bases 102 and 104 of the transistors 101 and 103, respectively. The transistors 101 and 103 are connected in a long-tail pair configuration supplied by the current generator formed by the transistor 105. The transistors 107 and 109 provide active collector loads for the transistors 101 and 103, respectively. The transistors 107 and 109 are connected in a current mirror arrangement. The resistor 111 (2.5 k) in the emitter of the transistor 109 unbalances the current mirror, creating an input threshold of about 2 mV. This arrangement forms the threshold detector 100.

When the signal level difference between the bases of the transistors 101 and 103 is below the threshold, the collector of transistor 103 feeds current into the base of transistor 113, which holds the transistor 113 on continuously. This holds the transistors 115 and 117 off. The transistor 115 provides the control signal 44 that controls the receive ALC circuit 7 to reduce receive line noise. The transistor 117 provides the control signal 43 that controls the timer 45. When the signal level difference between the bases of the transistors 101 and 103 exceeds the threshold value, the transistor 113 is turned off. This turns the transistor 115 on, and changes the control signal 44 to its low state, and turns the transistor 117 on, which changes the control signal 43 to its low state, resetting the timer 45.

The Timer

The timer 45 is also shown in FIG. 2. To reduce printed circuit board (PCB) area and reduce costs it is desirable to use a small value ceramic capacitor to provide the time constant of the timer, which is required to be of the order of 3 minutes. Ceramic capacitors are small in size and low in cost compared to aluminum or tantalum electrolytic capacitors that are conventionally used to achieve time constants of this length. Ceramic capacitors are also relatively stable with regard to temperature and have low leakage currents, which make the resulting timing more reliable. In this application, the timing does not have to be highly accurate, but the low leakage of the ceramic capacitor used in this application allows a very low charging current to be used, which enables the required time constant to be achieved using a physically small capacitor. The low leakage of the ceramic capacitor enables the timing capacitor 119 to be charged reliably using the base current of a high gain transistor running with a low collector current (in this case the transistor 121). The base current provides a substantially constant charging current of about 5 nA (the current provided by the current source formed by the transistor 123 divided by the current gain of the transistor 121). This allows the required 3 minute delay to be obtained with a 1 μF capacitor.

The actual base current charging the capacitor 119 can vary widely, since the transistor 121 has a specified current gain range of about 3:1. Moreover, the current gain of the transistor 121 is temperature dependent. The time-out time of the timer 45 can vary widely between different samples of the same amplifier, and can vary in one sample of the amplifier depending on the temperature. The time-out time of the timer varies between 1 minute and 5 minutes. Although this variation appears large, it makes little practical difference to the increase in battery life produced by the battery saver circuit because it is small compared with the time that the battery saver circuit keeps the amplifier remains off, i.e., 16 hours overnight, or 64 or 88 hours over a two- or three-day weekend.

When the control signal 43 at the collector of the transistor 117 goes low, even for a short time, indicating that there is activity above the threshold of the threshold detector 100 on the receive line, this causes the transistor 125 to conduct, which turns on the transistors 127 and 129, which both have their bases connected to the collector of the transistor 125. The transistor 127 holds the base of the transistor 125 low, which holds the transistor 125 on. The transistor 125 and the transistor 121 are connected in a long-tail pair configuration which is fed with current by the current generator formed by the transistor 123. The transistor 121 is therefore off.

The transistor 129 discharges the timing capacitor 119 until the voltage across the capacitor reaches a few hundred millivolts, the actual voltage being determined defined by the saturation voltage of the transistor 129. While there is activity on receive line above the threshold of its threshold detector 100, the circuit will stay in this condition. When activity on the receive line falls below the threshold of the threshold detector 100, the control signal 43 on the collector of the transistor 117 goes high, and the current from the current source formed by the transistor 123 is dropped across the resistor 131, which turns the transistor 125, and hence the transistors 127 and 129, off. The transistor 125 turning off turns the transistor 121 on. The base current of the transistor 121 slowly charges the capacitor 119. The voltage on the capacitor 119 rises until it reaches about 2 $V_{be}$ above ground. When the voltage across the capacitor 119 exceeds about 2 $V_{be}$ above ground, the diode 133 and the transistor 135 turn on, which pulls down the 1.2 V reference line 38 (FIG. 1) and significantly reduces the current drawn by the amplifier 1 (FIG. 1).

The timer stays in its set condition until there is activity on the receive line above the threshold of the threshold detector 100. This changes the control signal 43 to its low state, which resets the timer as described above. This in turn switches the transistor 135 off, restores the 1.2 V reference line 38 to its normal voltage, and allows the amplifier to draw its normal current from the battery again.

The timer 45 stays in its reset condition all the time that the control signal 43 is low, as described above. Only when the control signal 43 goes high does the timer 45 begin to time its time-out time. Only if the timer 45 reaches the end of its time-out time without the control signal 43 once more going low, i.e., without there being activity on the receive line above the threshold of the threshold detector 100, does the timer time out and cause the transistor 135 to pull down the 1.2 V reference line 38 which effectively switches the amplifier off. Activity on the receive line above the threshold of the threshold detector 100 immediately causes the control signal 43 to go low, which resets the timer and releases the 1.2 V reference line 38, which switches the amplifier back on.

The 1.2 V reference line 38 is preferably connected to all of the signal processing electronics blocks in the amplifier except the line monitor 41, and the timer 45, which must be connected to a separate 1.2 V reference so that they remain active while the rest of the amplifier electronics is switched off. The microphone power supply 21 and the earphone driver amplifier 11 must be designed so that they switch on and off without causing clicks and pops. Otherwise, they should be left powered continuously. Approximately one hundred microamps of current can be saved by switching off the microphone power supply 21 and the earphone driver amplifier 11. In the preferred embodiment, the battery saver circuit reduces the current drawn from the battery 39 from about 400 μA to about 70 μA.

Receive Line Noise Reduction

In FIG. 1, the ALC control circuit 9 of the receive ALC amplifier 7 provides a control current into the control input of the ALC amplifier that depends on the output level of the earphone driver amplifier 11. The ALC amplifier 7 is preferably a transconductance amplifier. The actual output level of the ALC amplifier 7 is determined by the adjustment of the volume control 51. The ALC control circuit 9 also receives the control signal 44 from the line monitor 41. In FIG. 2, the control signal 44 is provided by the collector of the transistor 115. The control signal 44 is low when the activity on the receive line is above the threshold of the threshold detector 100, and high when the activity on the receive line is below the threshold of the threshold detector 100. The rate of rise control signal 44 is limited by the capacitor 137 and the resistor 139. The relatively gentle rise of the control signal 44 enables the output level of the ALC amplifier 7 to be reduced without clicks or pops.

Figure 3:
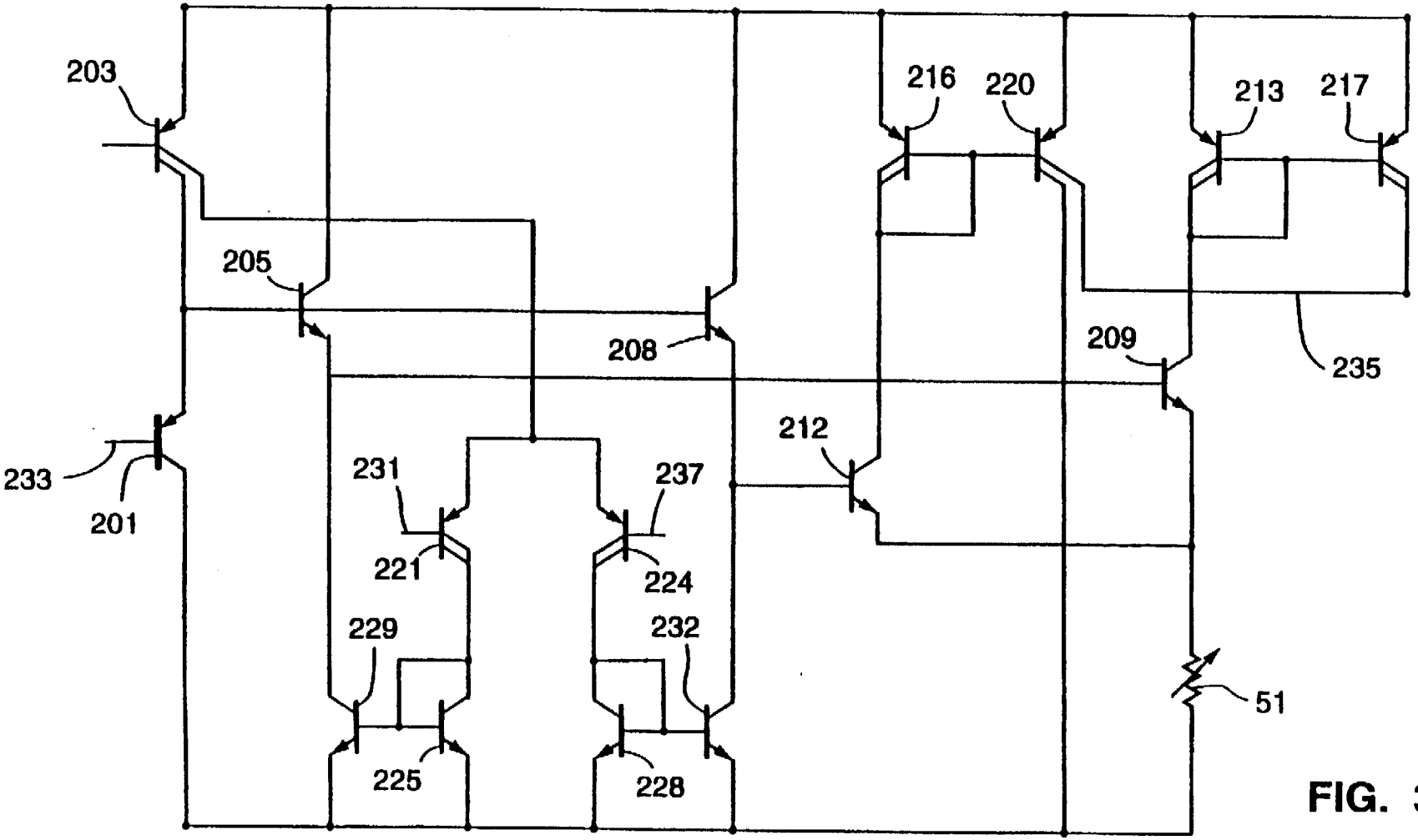
FIG. 3 shows a schematic diagram of the automatic level control circuit adapted for providing receive line noise reduction circuit according to the invention.

The ALC control circuit 9 is shown in FIG. 3. The input of the ALC control circuit 9 is fed by the output of the earphone driver amplifier 11. The ALC control circuit produces a current that represents the amplitude of the signal on the output of the earphone driver amplifier 11. In a conventional ALC circuit the ALC control circuit output would be used directly to set the gain of the ALC amplifier, and thus to limit the amplitude of the signal fed to the earphone. In the amplifier according to the invention, the output of the earphone driver amplifier 11 is applied to the base of the transistor 201, the emitter of which is fed by the constant current generator formed by the transistor 203. The emitter of the transistor 201 is connected to the bases of the transistors 205 and 208. The emitters of the transistors 205 and 208 are connected to the bases of the transistors 209 and 212 respectively. The emitters of the transistors 209 and 212 are connected together and via the manual volume control potentiometer 51 (1 M ohm) to ground. The collector of the transistor 209 is connected to the current mirror formed by the transistors 213 and 217, and the collector of the transistor 212 is connected to the current mirror formed by the transistors 216 and 220.

The outputs of the current mirrors are connected together and provide the current output of the ALC amplifier control 9. The current mirror formed by the transistors 216 and 220 is a unity ratio current mirror. whereas the current mirror formed by the transistors 213 and 217 is a 4:1 current mirror. One of the two paths between the input 233 and the output 235 is selected by the switch comprising the transistors 221, 225, and 229, and 224, 228, and 232. Current from the current generator formed by the transistor 203 flows through the transistors 221 and 224, which are in a long-tail pair arrangement. The base of the transistor 221 is connected to the 1.1 V reference 231. The base 237 of the transistor 224 is connected to the control signal 44.

When the activity, on the receive line is above the threshold of the threshold detector 100, the control signal 44 is low. The transistor 224 is on, and, consequently, the transistor 221 is off. Current from the current generator formed by the transistor 203 passes through the transistor 224 into the diode-connected transistor 228. This causes the transistor 232 to conduct, which causes the signal fed into the input 233 to appear on the emitter of the transistor 208. No signal appears on the emitter of the corresponding transistor 205, because the transistor 221, and hence the transistors 225, 229, and 205 are not conducting.

The signal on the base of the transistor 212 causes a current to flow from the collector to the emitter of the transistor. The magnitude of the collector current depends on the setting of the manual volume control 51 and the voltage on the emitter of the transistor 212 (and hence on the input at the input 233.) Increasing the value of the potentiometer 51 decreases the collector current and increases the output level of the ALC amplifier 7. The collector current from the transistor 212 flows into the current mirror formed by the transistors 216 and 220. This is the unity ratio current mirror, so the current from the current mirror and hence the output current fed into the ALC amplifier 7 is subsuntially equal to the collector current of the transistor 212.

When the activity on the receive line falls below the threshold of the threshold detector 100, the control signal 44 goes high. The changing level of the control signal 44 causes the long-tail pair formed by transistors 221 and 224 change state, so that, with the control signal 44 in its high state, the transistor 221 is conducting and the transistor 224 is non-conducting. This causes the signal at the input 233 to appear at the base of the transistor 209, instead of at the base of the transistor 212. The resulting collector current of the transistor 209 is substantially equal to what the collector current of the transistor 212 was before the control signal 44 went high and transistor 212 was switched off (this assumes that the signal of the input 223 is unchanged, and that the manual volume control 51 has not been adjusted). The collector current of the transistor 212 is mirrored by the current mirror formed by the transistors 213 and 217. This current mirror is a 4:1 ratio current mirror, so the output current fed into the ALC amplifier 7 from the collector of the transistor 217 is about four times the collector current of the transistor 209. The current fed into the ALC amplifier 7 is also about four times the current that was fed into the ALC amplifier by the current mirror formed by the transistors 216 and 220 before the control signal 44 went high. This increased current reduces the output level of the ALC amplifier by a factor of 4, or 12 dB.

Switching the current ratio of the current mirror providing the ALC amplifier control signal according to whether the control signal 44 is high or low, i.e., according to the activity on the receive line, changes the operatang point on the combined E/volume control characteristic of the, ALC amplifier 7. When the 4:1 ratio mirror is selected, an ALC amplifier output level some 12 dB lower wiI1 produce the same ALC amplifier control current compared with when the 1:1 ratio current mirror is selected. This effectively reduces the output level of the ALC amplifier by 12 dB without adjusting the manual volume control.

The control signal t4 is taken from the collector of the transistor 115. The transistor 115 is connected to the 1.2 V reference line 38 through the high value (10 Mohm) resistor 139, and the capacitor 137 (0.22 μF) is connected between the collector of the transistor and ground. This causes the control signal 44 to go high relatively slowly, with a time constant of about 2.2 seconds. This means that there is a considerable delay before the control signal 44 rises to 1.1 V, which is the voltage on the base of the transistor 221. Moreover, when the control signal 44 is comparable with the 1.1 V reference voltage on the base of the transistor 221, it is changing slowly, and the transistor 224 turns on gradually, turning the transistor 221 off gradually. The transistors 221 and 224 are on simultaneously, and hence the chain of odd-numbered transistors and the chain of even-numbered transistors connected to the transistors 221 and 224 respectively are also on simultaneously-This causes the current fed into the ALC amplifier 7 to decrease relatively gradually, which enables the output level of the ALC amplifier 7 to be reduced without audible clicks or pops.

When the activity on the receive line exceeds the threshold of the threshold detector 100, the transistor 115 (FIG. 2) switches on and discharges the capacitor 137 rapidly, and the control signal 44 goes low. This rapidly restores the normal gain of the ALC amplifier 7 once there is activity on the receive line. Any clicks and pops that might result from the rapid increase in the ALC amplifier gain are masked by the signal on the receive line, and are thus unnoticeable.

If the activity on the receive line remains below the threshold of the threshold detector 100 for the time out time of the timer 45, the output of the timer changes state and pulls the 1.2 V line down to ground. This switches off the earphone driver ampilfier 11, which effectively mutes the receive line noise. While the 1.2 V line is pulled low, enables the capacitor 137 discharges through the resistor 139, and ensures that, when the ALC amplifier 7 is switched back on when activity on the receive line resumes, it is in its normal gain condition.

Click-free Mute Switching

In FIG. 1, the audio signal from the microphone 19 is ampiflied by the switched gain amplifier 25, the gain of which is selected by the microphone control circuit 47. The switched gain amplifier has three gain conditions: a normal gain condition, a very low gain mute condition, and a −16 dB quieting condition. The very low gain mute condition, the normal gain condition, or the −16 dB quieting condition are all selected in response to the control signal 49 from the microphone monitor circuit 47. The output of the microphone 19 is amplified by the microphone monitoring amplifier 27. When the output of the microphone morntoting amplifier 27 is above the threshold of the microphone monitor circuit 47, the control signal 49 is in one of its states, and the gain of the switched gain amplifier 25 in its normal condition. When the output of the microphone monitoring amplifier 27 is below the threshold of the microphone monitor circuit 47, the control signal 49 is in another of its states, and the gain of the switched gain amplifier is in its quieting condition, which is 16 dB less than in the normal condition. When the manual mute switch 31 is operated, the control signal 49 is an a third of its states, and the switched gain amplifier is in its mute condition.

Figure 4:
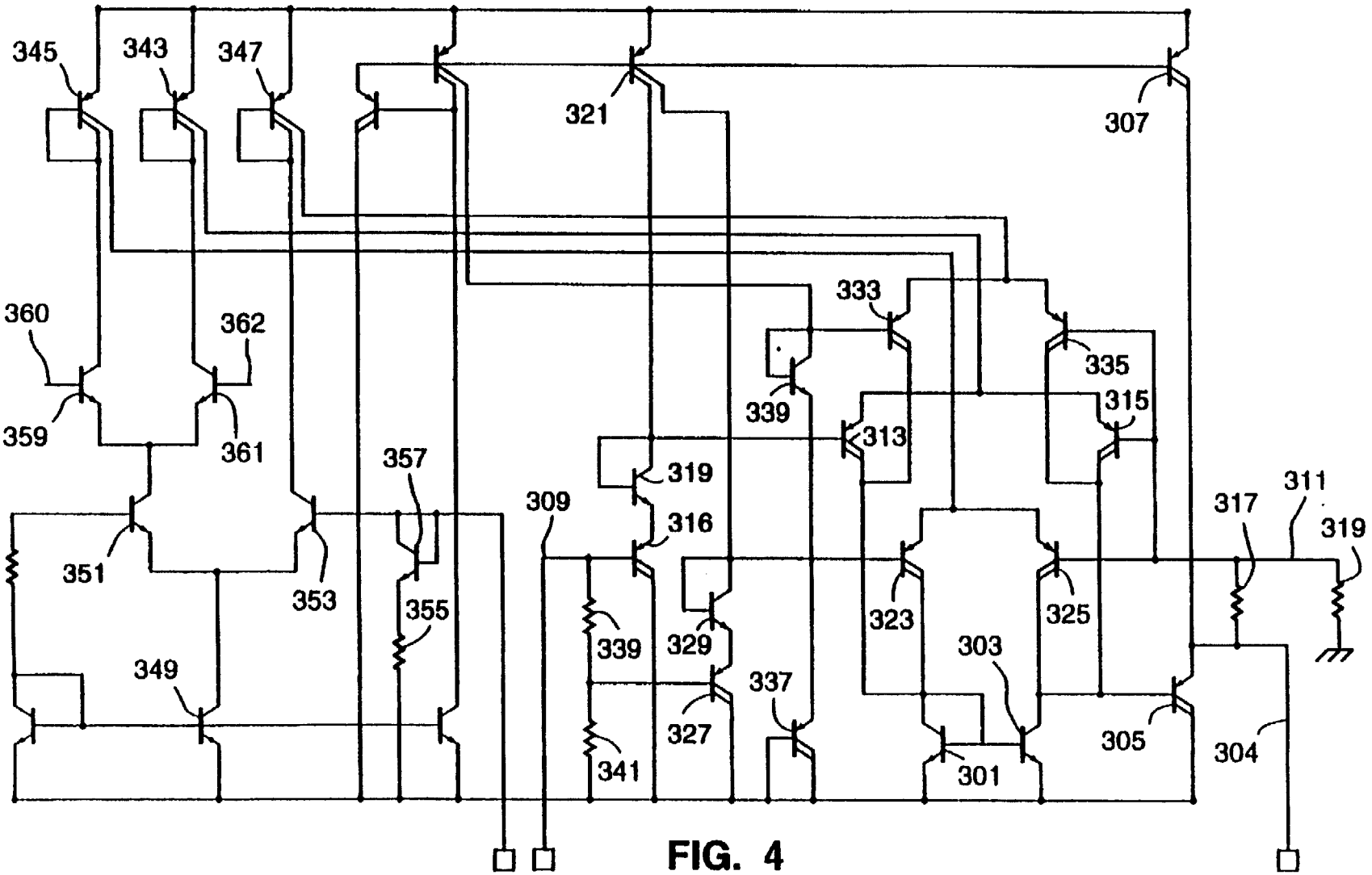
FIG. 4 shows a schematic diagram of the click-free switched gain amplifier circuit according to the invention.

Details of the switched gain amplifier are shown in FIG. 4. Three identical differential pairs of PNP transistors 313 and 315, 323 and 325, and 333 and 335 drive one current mirror active load formed by the transistors 301 and 303. Only one of the differential pairs of transistors is activated at a time, which switches the gain of the amplifier. One transistor of each differential pair is provided with an emitter-follower input buffer.

The amplifier output 304 is taken from the emitter of the transistor 305, which has the current source (not shown) as its emitter load. The amplifier is configured as a differential amplifier, with the same non-inverting input 309, inverting input 311, and output 304, used for all three gain positions.

Activating the differential pair of transistors 313 and 315 selects the normal gain position of the switched gain amplifier 25. The normal gain of the amplifier is set by the feedback resistor 317, connected between the amplifier output 304 and its inverting input 311, and the resistor 319 connected between the inverting input 311 of the amplifier and ground. The non-inverting input 309 is connected to the base of the transistor 317, which provides an input buffer for the transistor 313. The diode-connected transistor 319 provides a DC level shift between the input and the base of the transistor 313. The serial arrangement of the diode-connected transistor 319 and the transistor 317 is supplied with current by the current generator formed by the transistor 321. The emitter of the transistor 313 is connected to the emitter of the transistor 315 to form a long-tail pair. The base of the transistor 315 is connected to the inverting input 311. The collector of the transistor 313 is connected to the transistor 301, which forms one half of the active load. The collector of the transistor 303 is connected to the transistor 313, which forms the other half of the active load.

The transistors 323, 325, 327, and 329 form an identical stage to that just described. The collectors of the transistors 323 and 325 are connected in the transistors 301 and 303, respectively, of the active load as in the stage just described. The non-inverting input 309 is connected to the base of the transistor 327 via the attenuator formed by the resistors 339 and 341, which attenuates the input by 6 times, or 16 dB. This means that, when the transistors 323 and 315 are selected, the gain of the switched gain amplifier 25 is reduced by about 16 dB.

The transistors 333, 335, 337, and 339 form an identical stage to that just described. The collectors of the transistors 323 and 325 are connected to the transistors 301 and 303, respectively, of the active load. The base of the transistor 337 is connected to ground, instead of to the non-inverting input 309, which prevents the input signal from reaching the output when the transistors 333 and 335 are selected in the mute position. When the mute position is selected, the signal feedthrough is of the order of −60 dB.

The three gain positions of the switched gain amplifier 29 are selected by providing an emitter current to only one of the three identical differential pairs of PNP transistors, 313 and 315, 323 and 325, and 333 and 335. The three pairs of transistors are connected to three identical current mirrors formed by the transistors 343, 345, and 347, respectively. The manual mute switch 31, and the output of the microphone monitoring amplifier 27 are gated together to give priority to the mute switch and connect the input of only one of the three current mirrors to a single current generator formed by the transistor 349.

The base of the transistor 351 is connected to a reference potential and the base of the transistor 353 is connected to the mute switch 31. The base of the transistor 353 is held at ground potential by the resistor 355 and the diode-connected transistor 357. When the mute switch 31 is off, the base of the transistor 353 is held at ground potential, and the transistor 351 is conducting. In this condition, the transistors 359 and 361 select one of the current mirrors 343 or 345 is selected to supply current to the current generator 349.

The base of the transistor 359 is connected to a reference voltage which sets the threshold of the microphone quieting circuit. The base of the transistor 361 is connected to the output of the microphone monitor amplifier 27. When output of the microphone 19, and hence of the microphone monitoring amplifier 27, is low, the transistor 361 does not conduct, and the transistor 359 is conducting. The transistor 359 connects the input of current mirror 345 to the current generator formed by the transistor 349. The output of the current mirror 345 supplies current to the emitters of the transistors 323 and 325. This selects the −16 dB quieting gain condition of the switched gain amplifier, as described above.

When the signal level on the output of the microphone 19, and hence on the output of the microphone monitoring amplifier 27 rises above the threshold set on the base of the transistor 359, this causes the transistor 361 to conduct, and switches the transistor 359 off. The transistor 361 connects the input of the current mirror 343 to the current generator 349. The current output from the current mirror 343 supplies current to the emitters the transistors 313 and 315. This selects the normal gain position of the switched gain amplifier, as described above.

When the mute switch 31 is on, the base of the transistor 353 is pulled up to above the reference voltage on the base of the transistor 351, the transistor 353 is conducting and connects the input of the current mirror 347 to the current generator formed by the transistor 349. The output of the current mirror 347 supplies current to the emitters of the transistors 333 and 335. This selects the mute gain position of the switched gain amplifier, as described above.

By feeding the input signal attentuated by appropriate amounts into one of three identical differential pairs of transistors feeding a common load, and by selecting one of the differential pairs by feeding it with current from a single current generator selectively fed into one of three identical current mirrors, the gain of the switched gain amplifier can be switched without changing the DC level of the output, and hence without clicks or pops.

We claim:

1. An amplifier for amplifying a signal received on a telephone line and for providing an amplified signal to a telephone headset, the amplifier drawing current from a battery, and drawing a reduced current from the battery during periods of inactivity on the telephone line, the amplifier comprising:

timer means for generating a first control signal after a time-out time, the timer means being reset by a second control signal, the timer means comprising:

a current source having an output, a current mirror, a long-tail pair including a first transistor and a second transistor connected to the current mirror, a third transistor including:

a collector connected via a first resistor to the output of the current source;

a base being connected via a second resistor to the collector of the first transistor; and an emitter, the base of the first transistor being connected to the junction of the current generator and the first resistor, a fourth transistor including:

a base connected to the collector of the first transistor;

a collector connected to the base of the second transistor; and an emitter, a capacitor having two electrodes, the first electrode being connected to the base of the second transistor, the second electrode being connected to the emitters of the third and fourth transistors, and wherein the second control signal is connected to the collector of the third transistor and pulls the collector voltage of the third transistor close to the emitter voltage of the third transistor to reset the timer means;

threshold means for generating the second control signal when the signal on the telephone line is above a threshold level; and means responsive to the first control signal, for reducing the current drawn from the battery.

2. The amplifier of claim 1, wherein the threshold means comprises:

a current source;

two transistors in a long-tail pair, each transistor having an emitter coupled to the current source, a base and a collector; and an unbalanced current mirror; and wherein the base of each transistor is differentially coupled to the telephone line, the collector of each transistor is connected to the unbalanced current mirror, and the second control signal is taken from the collector of one of the transistors.

3. The amplifier of claim 1, wherein the threshold means comprises:

a current source;

a resistor;

a first transistor;

a second transistor having a collector, an emitter, and a base;

a third transistor having a collector, an emitter, and a base; and a fourth transistor having a collector, an emitter, and a base;

the first transistor including:

a base coupled to the telephone line, a collector connected to the collector and base the of third transistor and to the base of the fourth transistor, and an emitter connected to the emitter of the second transistor and to the current source, and wherein: the second transistor has its base coupled to the telephoned line, its collector connected to the collector of the fourth transistor, the third transistor has its emitter connected to the emitter of the fourth transistor via the resistor, and the collector of the second transistor provides the second control signal.

4. The amplifier of claim 3, additionally comprising a fifth transistor, the fifth transistor including:

a collector providing the second control signal;

an emitter connected to the emitter of the third transistor; and a base connected to the collector of the second transistor.

5. The amplifier of claim 1, wherein the means for reducing the current drawn from the battery comprises:

means for generating a reference voltage from the battery, and means for reducing the reference voltage in response to the first control signal.

6. An amplifier for amplifying a signal received on a telephone line and for providing an amplified signal to a telephone headset, the amplified signal having a level, the amplifier comprising:

threshold means for generating a first control signal when the signal received on the telephone line is below a threshold level;

automatic level control means for receiving the signal received on the telephone line and for controlling the level of the amplified signal provided to the headset to a set level in response to a second control signal;

control circuit means for generating the second control signal, the second control signal being a current, in response to the amplified signal provided to the headset and in response to the first control signal, the first control signal substantially reducing the set level, the control circuit means comprising:

a first current mirror means for receiving an input current at an input and generating an output current at an output, the output current providing the second control signal, a second current mirror means for receiving an input current at an input and generating an output current at an output, the output being connected to the output of the first current generating means, the output current providing the second control signal, current generating means for generating a current, and means for selectably connecting the current generated by the current generating means to the input of the first current mirror or to the input of the second current mirror in response to the first control signal.

7. The amplifier of claim 6, wherein the ratio between the output current and the input current of the first current generating means is less than the ratio between the output current and the input current of the second current generating means.

8. The amplifier of claim 6, wherein:

the amplifier additionally comprises volume control means for adjusting the level of the signal provided to the telephone headset; and the control circuit means is additionally for generating the second control signal in response to the volume control means.

9. The amplifier of claim 8, wherein the volume control means adjusts the level of the signal provided to the telephone headset by changing the current generated by the current generating means.

10. The amplifier of claim 8, wherein the ratio between the output current and the input current of the first current generating means is less than the ratio between the output current and the input current of the second current generating means.

11. An amplifier for amplifying a signal from a microphone, and for providing the amplified signal to a telephone line, the amplifier comprising:

attenuator means, having an input and an output, for attenuating the signal from the microphone;

a first transistor, including:

a base coupled to the signal from the microphone, an emitter, and
a collector connected to a load;

a second transistor, including:
a base coupled to the output of the attenuator means, an emitter, and
a collector connected to the load;
current generating means for generating a current;

switching means for switching the current from the current generating means to the emitter of the first transistor or to the emitter of the second transistor in response to a control signal; and means for deriving the amplified signal from the load.

12. The amplifier of claim 11, wherein the first transistor is coupled to a third transistor in a long-tail pair arrangement, and the second transistor is coupled to a fourth transistor in a long-tail pair arrangement.

13. The amplifier of claim 11, wherein:

the amplifier additionally comprises threshold means for generating the control signal when the signal from the microphone is above a threshold level, and the switching means switches the current to the emitter of the first transistor when the signal from the microphone is above the threshold level.

14. The amplifier of claim 11, wherein:

the amplifier additionally comprises mute switch means for generating the control signal, and the switching means switches the current to the emitter of the second transistor in response to the control signal, and the attenuating means is for attenuating the signal by more than 40 dB.

15. The amplifier of claim 11, wherein the switching means is a first switching means, the control signal is a first control signal, and the amplifier further comprises:
a third transistor, including:
a base coupled to ground,
an emitter, and
collector connected to the load; and
a second switching means for switching the current generated by the current generator to the emitter of the third transistor, or to the first switching means in response to a second control signal.

16. The amplifier of claim 15, further comprising:

threshold means for generating the first control signal when the signal from the microphone is above a threshold level;

mute switch means for generating the second control signal; and wherein
the first switching means switches the current to the emitter of the first transistor in response to the first control signal when the signal from the microphone is above the threshold level, and
the second switching means switches the current to the emitter of the third transistor when the mute switch means generates the second control signal.

17. The amplifier of claim 11, wherein the first transistor or the second transistor provides a current to the load, and the current provided to the load remains substantially constant when the switching means switches the current from the emitter of the first transistor to the emitter of the second transistor in response to the control signal.

18. The amplifier of claim 6, wherein the control circuit means further comprises:

amplifying means for amplifying the amplified signal provided to the headset to provide a second amplified signal, the amplifying means having a first gain state and a second gain state, higher than the first gain state, the first control signal selecting the second gain state; and means for generating the second control signal from the second amplified signal.

19. The amplifier of claim 1, wherein the time-out time of the timer means is determined by the base current of a transistor charging a capacitor.

*20. An amplifier for amplifying a signal received on a telephone line and for feeding an amplified signal to a telephone headset, the amplifier having a first state wherein the amplifier amplifies the received signal and draws a normal current from a power supply, and a second state wherein the amplifier draws a reduced current from the power supply, the amplifier switching from the first state to the second state when the received signal remains below a threshold level for a predetermined time-out period, the amplifier switching from the second state to the first state in response to the received signal exceeding the threshold level, the amplifier comprising:*

*a timer means functioning to maintain the amplifier in the first state as long as the received signal exceeds the threshold level, and for switching the amplifier into the second state after the received signal drops below the thresold level for the predetermined time-out period, the timer means further functioning to switch the amplifier back to the first state when the received signal exceeds the threshold level, wherein the predetermined time-out period of the timer means is determined by the amount of time required to change the voltage on a capacitor from a first voltage to a second voltage; and*

*reset means, operating in response to the received signal exceeding the threshold, for fully resetting the timer means to the predetermined time-out period by changing the voltage on the capacitor to the first voltage, regardless of the amount of time for which the received signal exceeds the threshold.*

*21. The amplifier of claim 20, wherein:*

*the reset means includes:*
*line monitoring means for generating a reset signal when the received signal exceeds the threshold level, and*
*means for fully resetting the timer means in response to the reset signal; and*

*the timer means includes power control means for selectively switching the amplifier between the first state and the second state, the power control means switching the amplifier back to the first state in response to the reset signal.*

*22. The amplifier of claim 21, wherein the current is the base current of a transistor.*

*23. The amplifier of claim 21, wherein the reset means includes:*

*holding means, triggered by the reset signal and monitoring the voltage on the capacitor, for generating a holding signal, the holding means, after triggering, generating the holding signal for as long as the voltage on the capacitor is different from the first voltage; and*

*voltage restoring means, operating in response to the holding signal, for restoring the voltage across the capacitor to the first voltage.*

*24. The amplifier of claim 21, wherein the monitoring means including an unbalanced long-tail pair.*

*25. The amplifier of claim 20, wherein the reset means includes line monitoring means for determining when the received signal exceeds the threshold level.*

*26. The amplifier of claim 25, wherein the reset means resets the timer means to the predetermined time-out period when the line monitoring means determines that the received signal has a peak level exceeding 2 mV.*

*27. An amplifier for amplifying a signal received on a telephone line and for feeding an amplified signal to a telephone headset, the amplifier having an first state wherein the amplifier amplifies the received signal and draws a normal current from a power supply, and a second state wherein the amplifier draws a reduced current from the power supply, the amplifier switching from the first state to the second state when the received signal remains below a threshold level for a predetermined time-out period, the amplifier switching from the second state to the first state in response to the received signal exceeding the threshold level, the amplifier comprising:*

*control means for switching the amplifier from the first state to the second state in response to a control signal reaching a predetermined level:*

*timing element means, including a capacitor, for applying the control signal to the control means;*

*control signal changing means for gradually changing the control signal applied by the timing element means from a starting level towards the predetermined level by operating to selectively supply current to, and to remove current from, the capacitor to change a voltage on the capacitor; and*

*reset means, operating in response to the received signal exceeding the threshold, for resetting the control signal applied by the timing element means to the starting level regardless of the amount of time for which the received signal exceeds the threshold.*

*28. The amplifier of claim 27, wherein the control means includes a transistor having a base-emitter voltage, the transistor switching the amplifier from the first state to the second state in response to the voltage on the capacitor reaching the base-emitter voltage.*

*29. The amplifier of claim 27, wherein the reset means includes a switching element connected across the capacitor.*

*30. The amplifier of claim 27, wherein:*

*the amplifier additionally comprises line monitoring means for generating a reset signal when the received signal exceeds the threshold; and*

*the reset means resets the control signal to the starting level in response to the reset signal.*

*31. The amplifier of claim 30, wherein:*

*the reset means includes a switching element connected across the capacitor; and*

*the reset means operates the switching element in response to the reset signal.*

* * * * *